United States Patent [19]

Byfield, Jr.

[11] Patent Number: 4,579,358
[45] Date of Patent: Apr. 1, 1986

[54] RACK FOR SPOOLED WIRE

[76] Inventor: Dwight Byfield, Jr., 1383 Crespi Dr., Pacifica, Calif. 94044

[21] Appl. No.: 493,762

[22] Filed: May 11, 1983

[51] Int. Cl.⁴ .............................................. B62B 1/00
[52] U.S. Cl. ......................... 280/79.1 A; 242/86.5 R; 280/47.19; 280/79.3
[58] Field of Search ................. 280/79.1 A, 79.1 R, 280/79.3, 47.19, 47.24; 242/130.4, 131, 131.1, 137.1, 86.5 R, 129; 248/346, 309.2

[56] References Cited

U.S. PATENT DOCUMENTS

| | | | |
|---|---|---|---|
| 1,377,052 | 5/1921 | Black | 242/131.1 |
| 1,386,556 | 8/1921 | DeVito | 242/131 |
| 2,828,928 | 4/1958 | Kollisch | 242/137.1 |
| 3,570,731 | 3/1971 | Waltz | 280/79.3 X |
| 3,937,414 | 2/1976 | Bank et al. | 242/86.5 R |
| 3,990,653 | 10/1976 | Marcell | 242/129.8 |

Primary Examiner—David M. Mitchell
Assistant Examiner—Mark C. Dukes
Attorney, Agent, or Firm—Flehr, Hohbach, Test, Albritton & Herbert

[57] ABSTRACT

An improved apparatus is provided for holding spooled wire. Several shelves are mounted on a wheeled cart. Each shelf has numerous apertures adapted to hold spindles. The spindles are adapted to hold and facilitate the turning of heavy spools of wire. A wire guide is mounted on the edge of each shelf. Numerous spools can be placed in staggered rows on a single shelf thereby making it practical to have immediate access to numerous insulation colors for each gauge of wire.

6 Claims, 6 Drawing Figures

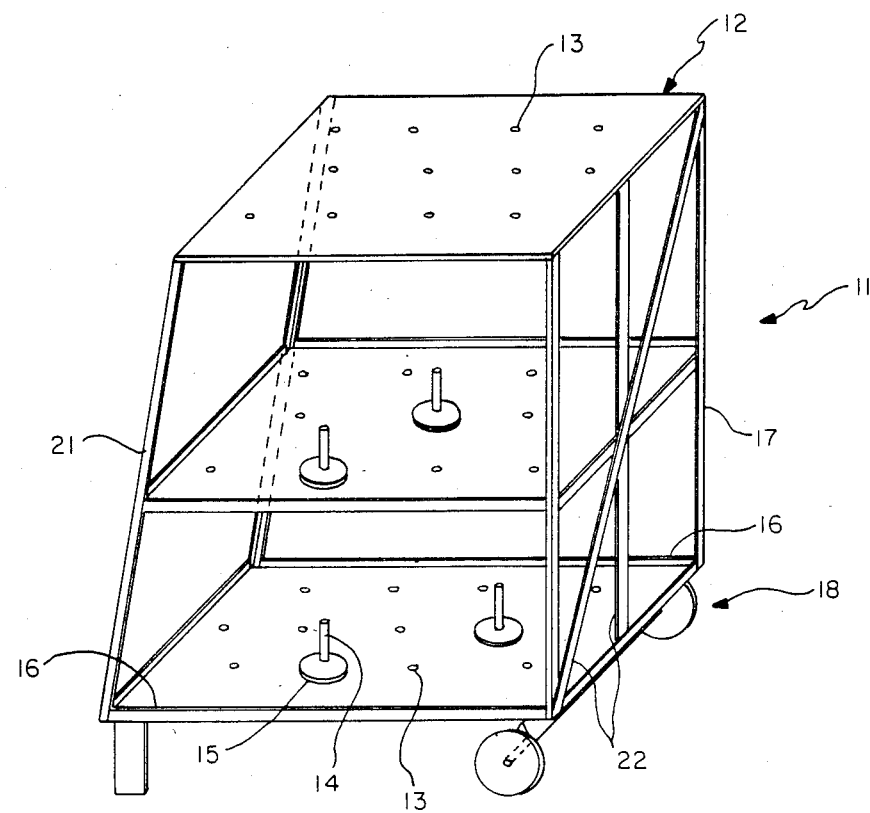
FIG. —1
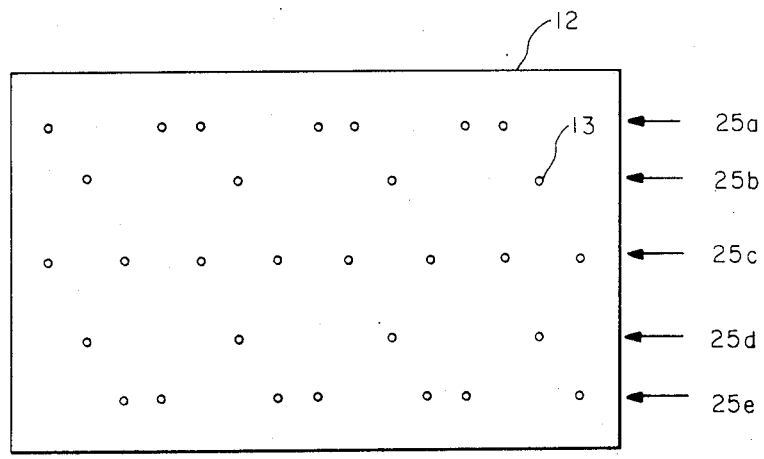
FIG. —2

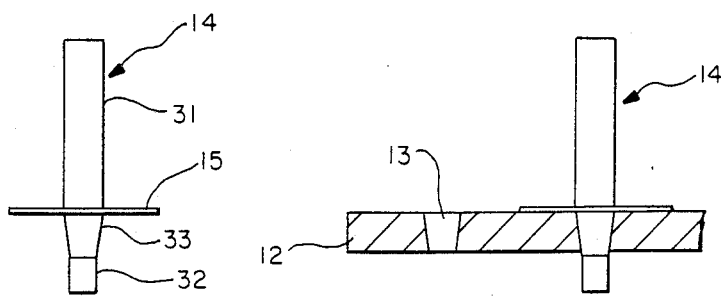
FIG.—3a  FIG.—3b
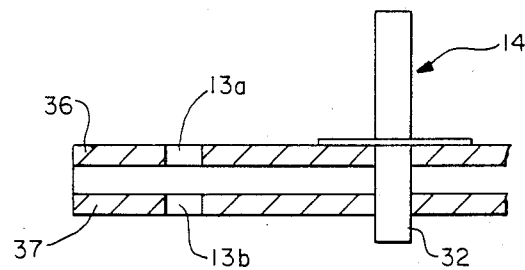
FIG.—3c
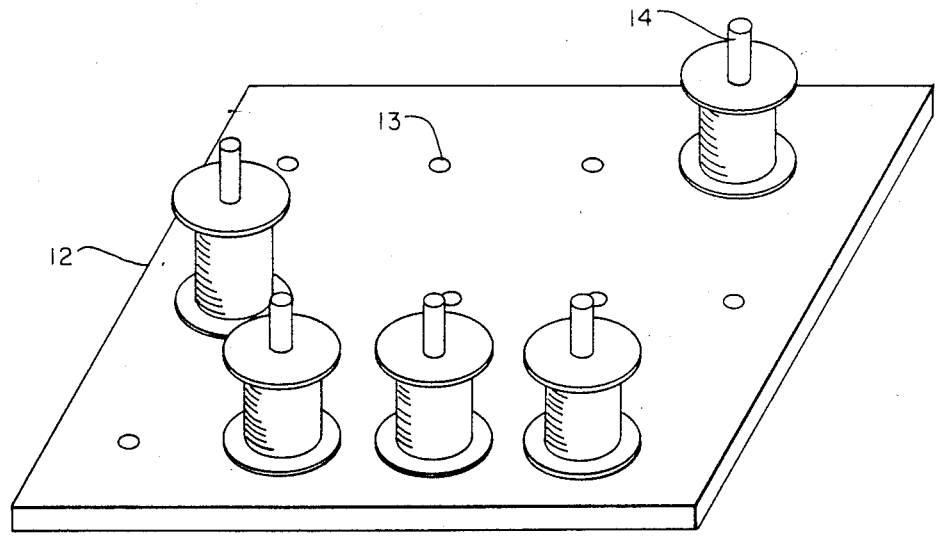
FIG.—4

RACK FOR SPOOLED WIRE

This invention relates generally to an apparatus and method for holding heavy spools of wire.

Many supply and repair businesses need to maintain an open inventory of spooled wire in numerous guages and colors, the number of types of wire often ranging from 50 to 150. The spools of wire are heavy, a single spool being as light as a pound (or even less) and as heavy as 150 pounds. Generally, such spools need to be kept in open racks for easy access.

The prior art for holding spooled wire generally involved the use of a horizontal bar passing through the axial bore of a plurality of spools. To remove wire from a spool one pulls on the wire thereby causing the spool to rotate on the bar. This prior art has several distinct shortcomings. First, and foremost, replacing an empty spool is a difficult process. The bar, which is laden with heavy spools, must be released from its support or hanger. Then, while manually supporting the bar, one must then slip off all the spools between the lifted end and the empty spool, then replace the empty spool, remount the spools just removed, and finally remount the bar on its support or hanger. The longer the bar, the more burdensome this task becomes. Second, the spools often rub against one another while the user is removing wire from one spool thereby inhibiting rotation of the spool. Third, an apparatus with several vertically staggered bars tends not to be space efficient.

It is an object of this invention to provide an improved apparatus and method for holding spooled wire.

Further objects of this invention are to make individual wire spools easily replaceable, to reduce the friction associated with removing wire from a spool, and to store spools of wire in a more convenient and space efficient manner.

In summary the apparatus of the invention comprises a shelf with a plurality of apertures and a plurality of spindles inserted into these apertures for holding spools of wire.

In the preferred embodiment the apparatus has a plurality of shelves mounted on a wheeled cart. The shelves each have apertures arranged in a series of staggered rows adapted to hold several rows of spooled wire. The spindle has a washer around it that rests against the shelf and facilitates the rotation of the spool. On the edge of each shelf there is a wire guide for passing wire through.

The method of the invention comprises rotatably mounting a plurality of spools of wire on cylindrical spindles mounted on a shelf.

FIG. 1 is a perspective view of the apparatus.

FIG. 2 is a sectional view of a shelf.

FIGS. 3a, 3b and 3c show sectional views of a spindle and washer, and of an aperture for a spindle in a shelf, respectively.

FIG. 4 is a perspective view of one shelf with several spools mounted thereon.

Referring to FIG. 1, there is shown a perspective view of the preferred embodiment of the invention. The apparatus 11 includes a plurality of sturdy shelves 12, made typically of heavy sheet metal able to support a load of a couple of hundred pounds. Corner support beams 21 support the shelves 12. Lighter sheet metal can be used for the shelves if lateral support beams 22 are added. The shelf 12 contains numerous apertures 13 in which spindles 14 can be inserted. On or near the outer edge of each shelf 12 is a wire guide 16 through which wire can be drawn. A wheeled 18 frame 17 is provided to support several shelves 12 on a single apparatus 11.

Referring to FIG. 2, the apertures 13 in the shelf 12 may be made in a series of staggered rows (25a, 25b, 25c, 25d, 25e). The pattern chosen should provide many choices for organizing numerous spools on a single shelf without compromising the strength of the shelf with two many apertures. See FIG. 4 for a perspective view of a single shelf 12 with several spools thereon.

Referring to FIGS. 3a and 3b, the spindles 14 and apertures 13 in the shelf 12 may be tapered 33 to provide lateral support. The spindle 14 has a washer 15 permanently mounted thereon, separating the upper 31 and lower 32 sections of the spindle's dowel. Alternately, as shown in FIG. 3c, the shelf may be made of two layers 36 and 37 with corresponding holes 13a and 13b. The bottom section 32 of the spindle 14 will go through both layers, thereby preventing the spindle from shifting from its intended vertical position.

Normally the lightest spools will be placed on the upper shelves 12 and the heavier ones on the bottom shelves 12. Extremely heavy spools (e.g., over 50 pounds) can be put on the bottom shelf by rolling them next to the apparatus, inserting the spindle into the spool, and then tilting the spool onto the bottom shelf with the spindle going into an available slot. Space efficiency can be improved by spacing the shelves so that vertical clearance for each shelf is tailored to the size of the spools to be placed thereon.

To replace an empty spool on the apparatus 11 is a simple matter of lifting the empty spool, and its associated spindle, off the shelf, inserting the upper dowel 31 of the spindle 14 through the axial bore of a replacement spool; and inserting the lower dowel 32 of the spindle 14 in an aperture 13 in the shelf 12. There is no need to lift or move other spools, as is required when spools are stored on horizontal rods.

Since each spool is held on its own vertical spindle, when wire is drawn from a spool the main source of friction is at the base of the spool. Rotation of the spool is facilitated by the washer 15. The spool does not rub against other spools, as it would on a horizontal rod.

In practice it is often advantageous to have available as many insulation colors as possible to facilitate tracing individual wires. The rack of the present invention will accommodate many spools (i.e., with varying colors of insulation) in a small space, thereby making numerous insulation colors readily available.

The shelves and spindles are typically made of steel. Other materials of equivalent strength and durability will work equally well. The materials for the spindle's dowel and washer must not significantly hamper the rotation of the spools of wire. Standard sheet metal construction methods may be used for building the rack 17 and shelves 12.

As a variation, the top shelf of the rack 17 may be a simple shelf (i.e., without apertures 13) with a retaining ledge around the perimeter where the shelf is sized to hold a standard workman's toolbox, terminal box, and/or other assorted items.

While the above description and drawings illustrate the preferred embodiment and several possible variations for specific elements, those skilled in the art will recognize that changes in form and placement of parts may be made to suit varying requirements within the scope of the invention.

What is claimed:

1. Apparatus for holding a multiplicity of wire laden spools having axial bores, including a plurality of differently sized spools, the apparatus comprising:

a plurality of shelves each having a plurality of apertures, said apertures arranged in a plurality of parallel, staggered rows allowing access from one side of each shelf to a plurality of rows of spools;

a multiplicity of spindles, including spindles of different sizes adapted for holding said plurality of differently sized spools, each said spindle having a cylindrical dowel, the upper portion of said dowel exceeding the height of the spool to be mounted on said shelf using said spindle, each said spindle further having a diameter smaller than the bore of said spool, a lower portion of said dowel shaped to fit snuggly in one or more of said apertures, and having a washer permanently mounted around the base of the upper portion of said dowel, said washer providing vertical support for said spindle and facilitating the rotation of said spool thereon;

a wire guide mounted at each said shelf for drawing wire from said spools through; and support means for holding each of a plurality of said shelves in a distinct horizontal position, said shelves vertically spaced to allow insertion and removal of spools of wire thereon.

2. Apparatus as in claim 1 wherein said support means further includes wheels rotatably mounted and adapted to facilitate transportation of said apparatus.

3. Apparatus as set forth in claim 1, wherein said apertures in said shelves are tapered; and said lower portion of said dowels are tapered to fit snuggly in corresponding ones of said apertures.

4. Apparatus as set forth in claim 1, wherein the number of said apertures in said shelves exceeds the number of spindles to be inserted therein, thereby allowing said spools to be placed on said shelves in a variety of patterns.

5. A method of holding a multiplicity of wire laden spools having axial bores, including a plurality of differently sized spools, each with a core through its cylindrical axis, the steps of the method comprising:

(a) providing a cart with a plurality of shelves each having a plurality of apertures, said apertures arranged in a plurality of parallel, staggered rows;

(b) providing a multiplicity of spindles, including spindles of different sizes adapted for holding said plurality of differently sized spools, each said spindle having a cylindrical dowel, the upper portion of said dowel exceeding the height of the spool to be mounted thereon, the lower portion of said dowel shaped to fit snuggly in one or more of said apertures, and having a washer permanently mounted around the base of the upper portion of said dowel, said washer providing vertical support for said spindle and facilitating the rotation of said spool thereon; and (c) rotatably mounting a multiplicity of wire laden spools, including a plurality of differently sized spools, on said spindles.

6. A mobile cart for holding a multiplicity of differently sized wire laden spools having axial bores comprising:

a plurality of vertically spaced horizontal shelves coupled to a frame adapted for supporting said shelves, each shelf having a multiplicity of apertures;

at least one pair of wheels axially mounted on the bottom of said frame to enable wheeled locomotion of said cart;

a multiplicity of spindles adapted for mounting in selected ones of said shelf apertures and for rotatably holding a multiplicity of differently sized wire laden spools; and a wire guide mounted at each said shelf for drawing wire from said spools through;

wherein said apertures in said shelves are arranged in parallel, staggered rows so that a multiplicity of differently sized wire laden spools can be rotatably mounted on each said shelf.

* * * * *